(12) United States Patent
Wilkinson et al.

(10) Patent No.: US 11,900,587 B2
(45) Date of Patent: Feb. 13, 2024

(54) CONNECTOR MAP AND ASSEMBLY AID SOFTWARE FOR CABLE MANUFACTURING

(71) Applicant: Raytheon Company, Waltham, MA (US)

(72) Inventors: Michael P. Wilkinson, Hampstead, NH (US); Steven A. Iskra, Beverly, MA (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/322,254

(22) Filed: May 17, 2021

(65) Prior Publication Data

US 2022/0366554 A1 Nov. 17, 2022

(51) Int. Cl.
*G06T 7/00* (2017.01)
*G06T 11/60* (2006.01)
*H01R 43/20* (2006.01)

(52) U.S. Cl.
CPC ............ *G06T 7/001* (2013.01); *G06T 7/0008* (2013.01); *G06T 11/60* (2013.01); *H01R 43/20* (2013.01); *G06T 2207/30148* (2013.01)

(58) Field of Classification Search
CPC ........ H01R 43/20; H01R 43/26; H01R 43/28; Y10T 29/53091; Y10T 29/49131; Y10T 29/49169; Y10T 29/49769; Y10T 29/4978; Y10T 29/53013; Y10T 29/53174; Y10T 29/53217; Y10T 29/53243; G02B 6/3833; G02B 6/3885
See application file for complete search history.

(56) References Cited

U.S. PATENT DOCUMENTS

| | | | |
|---|---|---|---|
| 4,727,637 A | 3/1988 | Buckwitz et al. | |
| 6,793,401 B2 | 9/2004 | Daniel | |
| 8,099,857 B2 | 1/2012 | Shelley et al. | |
| 9,589,390 B2 | 3/2017 | DeStories et al. | |
| 10,189,160 B2 | 1/2019 | Helmick et al. | |
| 10,644,471 B2 | 5/2020 | Helmick | |
| 10,649,442 B2 | 5/2020 | Helmick et al. | |
| 10,811,833 B2 | 10/2020 | Crocco et al. | |
| 2004/0037508 A1 | 2/2004 | Daniel | |
| 2004/0213307 A1* | 10/2004 | Lieber .................. | B82Y 10/00 372/39 |

(Continued)

FOREIGN PATENT DOCUMENTS

| CN | 101510648 A | 8/2009 |
|---|---|---|
| CN | 201487688 U * | 5/2010 |

(Continued)

OTHER PUBLICATIONS

Office Action dated Jan. 5, 2023 in counterpart Taiwan Patent Appln. No. 111118354.

(Continued)

*Primary Examiner* — Ming Wu
(74) *Attorney, Agent, or Firm* — Bachman & LaPointe, P.C.

(57) ABSTRACT

A system for creating a wiring guide graphic comprising a database configured to receive inputs of a connector body identity, an engineering specification and a wiring table; and a processor coupled to the sensor, the processor configured to create a wiring guide graphic.

16 Claims, 4 Drawing Sheets

(56) References Cited

U.S. PATENT DOCUMENTS

| | | | |
|---|---|---|---|
| 2006/0099846 A1* | 5/2006 | Channell, Sr. | H01R 13/405 439/411 |
| 2006/0185158 A1* | 8/2006 | Kuhn | H01R 43/26 29/749 |
| 2009/0185158 A1* | 7/2009 | Wolf | G01S 7/4816 356/4.01 |
| 2016/0335800 A1 | 11/2016 | Destories | |
| 2017/0187155 A1 | 6/2017 | Jansen et al. | |
| 2018/0000563 A1* | 1/2018 | Shanjani | A61B 5/682 |
| 2018/0375235 A1 | 12/2018 | Nakano | |
| 2020/0044396 A1 | 2/2020 | Ito | |

FOREIGN PATENT DOCUMENTS

| | | | | |
|---|---|---|---|---|
| CN | 101867131 A | | 10/2010 | |
| CN | 107924373 A | | 4/2018 | |
| CN | 208225054 U | * | 12/2018 | ............ B41J 3/4073 |
| CN | 209085657 U | * | 7/2019 | ............... C25B 1/04 |
| JP | 6195279 B2 | | 9/2017 | |
| TW | 202029588 A | | 8/2020 | |

OTHER PUBLICATIONS

Rejection Decision dated Jun. 19, 2023 in counterpart Taiwan Application No. 111118354 filed May 17, 2022.
International Search Report and Written Opinion dated Sep. 29, 2022 in corresponding International Appln. No. PCT/US2022/029393.

* cited by examiner

| WIRING TABLE | | | | | | |
|---|---|---|---|---|---|---|
| DESCRIPTION | | | FROM | | TO | |
| FIND NO. | AWG | COLOR | REF DES | STATION | STATION | REF DES |
| 1 | 24 | WHITE | P1-1 | 1 | 29 | J3-1 |
| 1 | 24 | WHITE | P1-3 | 3 | 31 | J3-3 |
| 1 | 24 | WHITE | P1-5 | 5 | 33 | J3-5 |
| 1 | 24 | WHITE | P1-7 | 7 | 35 | J3-7 |
| 1 | 24 | WHITE | P1-9 | 9 | 37 | J3-9 |
| 5 | 20 | RED | P2-A | 6 | 39 | J4-C |
| 5 | 20 | RED | P2-B | 22 | 46 | J4-A |
| 5 | 20 | RED | P2-C | 23 | 47 | J4-B |
| 2 | 26 | BLUE/WHITE | J1-1 | 24 | 48 | P3-4 |
| 2 | 26 | BLUE/WHITE | J1-2 | 25 | 49 | P3-3 |
| 3 | 26 | BLUE/WHITE | J1-3 | 26 | 50 | P3-2 |
| 3 | 26 | BLUE/WHITE | J1-4 | 27 | 51 | P3-1 |
| 4 | 24 | BLACK | P1-2 | 2 | 30 | J3-2 |
| 4 | 24 | BLACK | P1-4 | 4 | 32 | J3-4 |

*FIG. 2*

CONNECTOR MAP AND ASSEMBLY AID SOFTWARE FOR CABLE MANUFACTURING

BACKGROUND

The present disclosure is directed to the improved process for connector plugging; particularly automation of the process of creating a graphic used for inserting wire assemblies into connectors.

Referring to FIG. 1, the proper insertion of electrical pins 10 into an electrical connector body 12 can be a tedious and time consuming process requiring significant manual dexterity and long-term concentration. The manual insertion of the electrical pins 10 can be error prone. Every wire 14 belongs in a specific connector cavity 16 in order for the harness/cable 18 to work as intended. An operator 20 steadies the connector body 12 and guides the electrical pin 10 of the wire 14 with a tool 22 into a predetermined connector cavity 16 as required by a predetermined wiring design.

Wires 14 plugged in the wrong cavity 16 can result in a test failure indicating a miswired wire. A single miswire can have catastrophic consequences for the down-stream user of the resultant wiring harness 18. Miswires must be reworked by extracting the wires 14 from the connector 12, re-plugging the wire 14 in the correct cavities 16, and retesting until 100% satisfactorily pass testing. Extracting the wire 14 can lead to damaged wires 14, electrical pins 10, and connectors 12. Current connector plugging processes do not have adequate aids to assist engineers or operators in preparation for the assembly process. Also, no manufacturing automation exists for this type of assembly.

What is needed is an improved process for preparing the graphic utilized by the operator to perform the connector plugging process with accuracy.

SUMMARY

In accordance with the present disclosure, there is provided a system for creating a wiring guide graphic comprising: a database including inputs of a connector body identity, an engineering specification and a wiring table; and a processor coupled to the database, the processor configured to create the wiring guide graphic.

A further embodiment of any of the foregoing embodiments may additionally and/or alternatively include the system further comprising a tangible, non-transitory memory configured to communicate with the processor, the tangible, non-transitory memory having instructions stored therein that, in response to execution by the processor, cause the processor to perform operations comprising: receiving, by the processor, data for the connector body identity from the database; receiving, by the processor, data for the engineering specification detailing a wire insert arrangement from the database; receiving, by the processor, data for the wiring table from the database; determining, by the processor, a map of each connector cavity associated with the connector body configured to populate each connector cavity associated with the connector body; and creating, by the processor, an image of a wiring guide graphic.

A further embodiment of any of the foregoing embodiments may additionally and/or alternatively include the map identifies each the connector cavity location and associates at least one of the wire and an empty space for each the connector cavity.

A further embodiment of any of the foregoing embodiments may additionally and/or alternatively include the wiring table comprises at least one of a systematic listing of a Find number, a wire gauge, a wire color, a reference designation, and a station number from one side of the wire to another side of the wire.

A further embodiment of any of the foregoing embodiments may additionally and/or alternatively include the connector cavity location is indicated by a coded system including at least one of a numerical code, an alphabetical code and an alpha-numerical code to indicate a location of the connector cavity.

A further embodiment of any of the foregoing embodiments may additionally and/or alternatively include the wiring guide graphic comprises a visual graphic of a connector body plugging face, wherein the wiring guide graphic is configured to indicate a cavity identification, a wire color, or a location of a cavity to remain empty.

A further embodiment of any of the foregoing embodiments may additionally and/or alternatively include the wiring guide graphic is configured to provide a visual map between technical requirements in order to locate visually where the wire should be inserted into the connector cavity.

In accordance with the present disclosure, there is provided a system comprising a computer readable storage device readable by the system, tangibly embodying a program having a set of instructions executable by the system to perform the following steps for creating a wiring guide graphic, the set of instructions comprising: an instruction to read at least one connector identity; an instruction to read at least one engineering specification indicating an insert arrangement; an instruction to read at least one wiring table; an instruction to populate a map for connector cavities; and an instruction to create an image of a wiring guide graphic.

A further embodiment of any of the foregoing embodiments may additionally and/or alternatively include the population of the map identifies each connector cavity and associates at least one of a wire and an empty space for each the cavity.

A further embodiment of any of the foregoing embodiments may additionally and/or alternatively include the wiring table comprises at least one of a systematic listing of a Find number, a wire gauge, a wire color, a reference designation, and a station number from one side of the wire to another side of the wire.

A further embodiment of any of the foregoing embodiments may additionally and/or alternatively include the connector cavity location is indicated by a coded system including at least one of a numerical code, an alphabetical code and an alpha-numerical code to indicate a location of the connector cavity.

A further embodiment of any of the foregoing embodiments may additionally and/or alternatively include the wiring guide graphic comprises a visual graphic of a connector body plugging face, wherein the wiring guide graphic is configured to indicate a cavity identification, a wire color, or a location of a cavity to remain empty or an enhancement.

A further embodiment of any of the foregoing embodiments may additionally and/or alternatively include the wiring guide graphic is configured to provide a visual map between technical requirements in order to locate visually where the wire should be inserted into the connector cavity.

In accordance with the present disclosure, there is provided a process for creating a wiring guide graphic by use of a system including a processor configured to receive from a database inputs of a connector body identity, an engineering specification and a wiring table; the processor configured to create the wiring guide graphic, a tangible, non-transitory memory configured to communicate with the processor, the tangible, non-transitory memory having instructions stored therein that, in response to execution by the processor, cause the processor to perform operations comprising: receiving, by the processor, data for the connector body identity from the database; receiving, by the processor, data for the engineering specification detailing a wire insert arrangement from the database; receiving, by the processor, data for the wiring table from the database; determining, by the processor, a map of each connector cavity associated with the connector body configured to populate each connector cavity associated with the connector body; and creating, by the processor, an image of a wiring guide graphic.

A further embodiment of any of the foregoing embodiments may additionally and/or alternatively include the map identifies each the connector cavity location and associates at least one of the wire and an empty space for each the connector cavity.

A further embodiment of any of the foregoing embodiments may additionally and/or alternatively include the wiring table comprises at least one of a systematic listing of a Find number, a wire gauge, a wire color, a reference designation, and a station number from one side of the wire to another side of the wire.

A further embodiment of any of the foregoing embodiments may additionally and/or alternatively include the connector cavity location is indicated by a coded system including at least one of a numerical code, an alphabetical code and an alpha-numerical code to indicate a location of the connector cavity.

A further embodiment of any of the foregoing embodiments may additionally and/or alternatively include the wiring guide graphic comprises a visual graphic of a connector body plugging face, wherein the wiring guide graphic is configured to indicate a cavity identification, a wire color, or a location of a cavity to remain empty.

A further embodiment of any of the foregoing embodiments may additionally and/or alternatively include the process further comprising inserting at least one wire into a connector cavity responsive to the wiring guide graphic.

Other details of the process for the preparation of the graphic for connector plugging are set forth in the following detailed description and the accompanying drawings wherein like reference numerals depict like elements.

BRIEF DESCRIPTION OF THE DRAWINGS

FIG. 2 is an exemplary wiring table.

DETAILED DESCRIPTION

Figure 1:
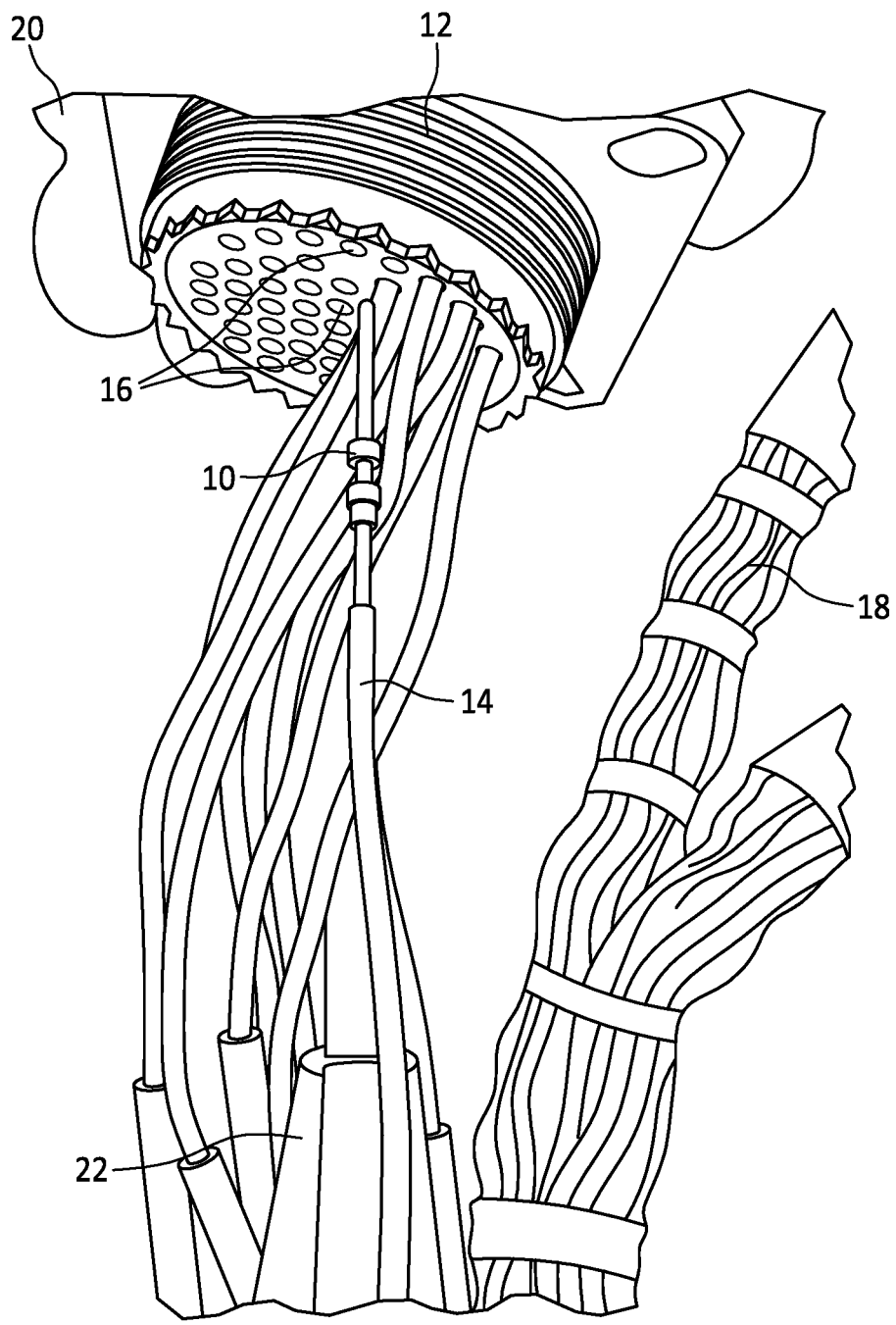
FIG. 1 is a prior art schematic of a connector plugging process.
Figure 3:
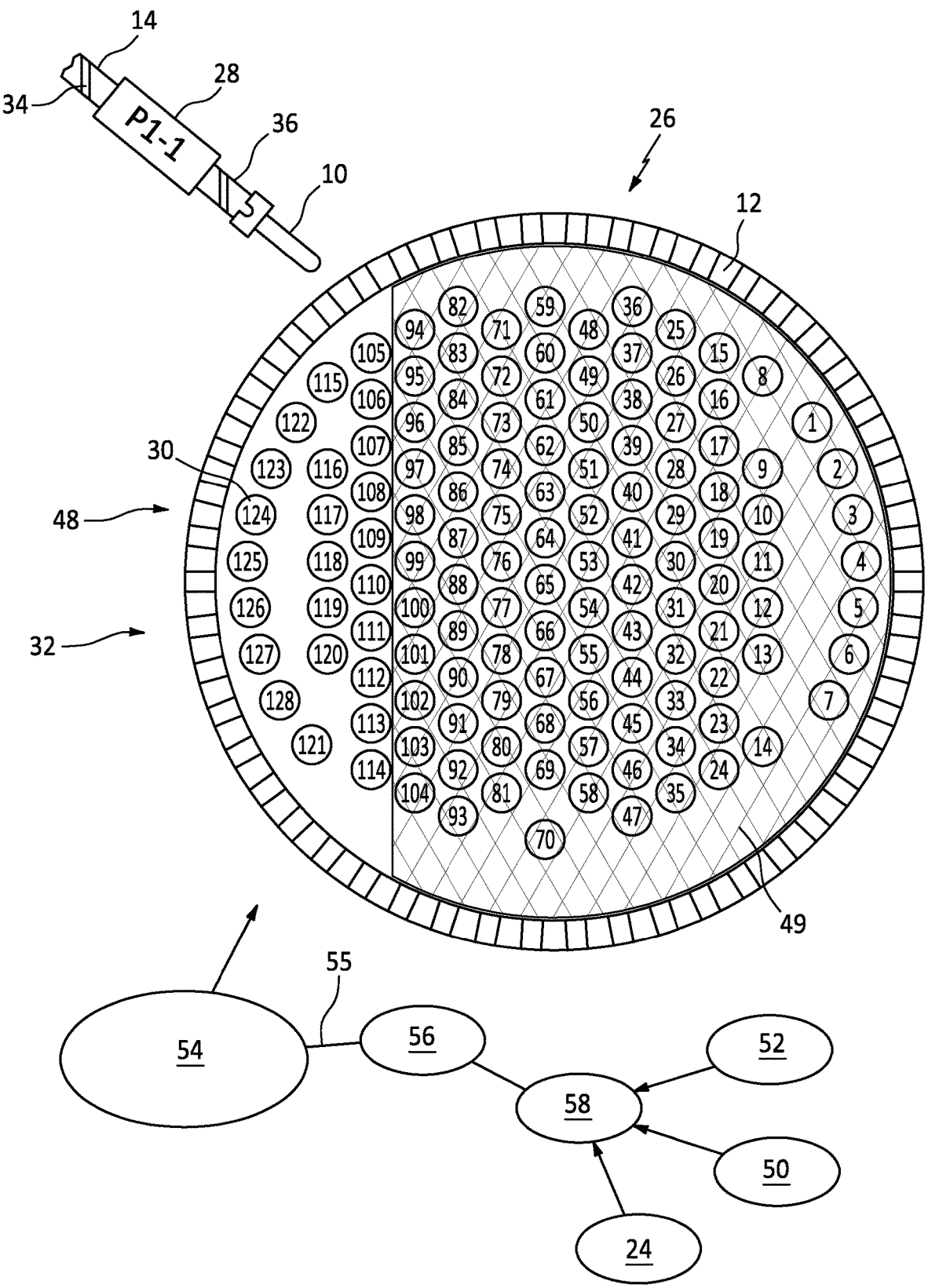
FIG. 3 is an exemplary wiring guide graphic adjacent an exemplary connector body and processor.

Referring also to FIGS. 2-3, showing an exemplary wiring table 24 and wiring guide graphic 26. When an operator 20 is preparing to install the wire 14 and electrical pin 10 into the connector cavity 16, the operator references a procedure that includes the wiring table 24 and the wiring guide graphic 26. The operator 20 understands which connector cavity 16 to plug the wire 14 based on a wire band marker 28. The wire band marker 28 indicates the connector identification and a cavity number 30 or other form of indicia that represents the location of the cavity 16 on the connector body 12. Connector cavity location can be indicated by coded system 32, including a numerical system, and alphabetical system and some connector bodies include an alpha-numerical code to indicate the location of the cavity 16. There are many connector body 12 designs, shapes and sizes that can include a variety of connector cavity 16 locations and location codes.

The wires 14 can include a color code 34 to distinguish the types of wire 14. For example the wire insulation 36 can include a color that distinguishes the wire 14, such as, red wire, black wire, white wire, blue wire, blue/white wire and the like.

The wiring table 24 provides a systematic listing of, the Find number 38, the wire gauge 40, the wire color 42, the reference designation 44, and the station number 46 from one side of the wire 14 to the other side of the wire 14. The Find number 38 can be the number associated with the parts list 50 to identify the specific wire part number to be used. The wire gauge 40 is the size/dimension of the gauge of the wire 14. The color 42 is the color of the wire insulation 36. The reference designation 44 can be the indication of the connector body 12 and the location of the connector cavity 16 that is designed to receive the wire 14 associated with the reference designation 44 on the horizontal line of the wiring table 24. The wiring table 24 includes the From and To designation in order to properly indicate where the wire goes to and from, that is, one end of the wire 14 to the other end of the wire 14. For example, the P1-1 indication includes the P1 designator for the P1 connector body 12 and the 1 designator for the first connector cavity 16. The P1 connector part number can be determined from the parts list 50 for the wire harness 18. The P indicates a plug and the J indicates a jack. The station number 46 indicates for a particular harness assembly 18, a location on the jig (not shown) to route and form the shape of the harness 18, prior to plugging any contacts into connectors 12.

The wiring guide graphic 26 can be a visual aid for operators to improve the process of connector plugging. The wiring guide graphic 26 is a visual graphic of a particular connector body 12 plugging face 48. The wiring guide graphic 26 indicates the particular cavity identification 30, the particular wire color 34, or a location of a cavity 16 that should remain empty or a location that receives a dummy contact. Depending on the particular connector design, some of the cavities 16 may remain empty or are plugged.

The process of creating the wiring guide graphic 26 can be performed by an engineer in a manual fashion. The engineer can reference the engineering specifications 52 that include the connector part number and the particular arrangement of wires 14 to be inserted into any particular connector cavity 16. The engineer can then create an image of the plugging face 48 by taking a picture or preparing a graphic arts representation by use of computer graphics tools. The engineer can make a representation on the graphic with an identity of each cavity 16 by use of the wiring table 24 and connector insert arrangement. The wiring guide graphic 26 can include an enhancement 49, such as shading, shadow image, contrast distinction that helps the operator 20 to focus on the cavity 16 and ignore the portions of the connector body 12 plugging face 48 that does not need attention.

The engineer can manually recreate the wiring table 24 as data 58 for a database 56 with the needed information containing, such as P1-1, color. The format of the input data 58 in the database 56 can be either a comma-separated value (CSV) form or in an Excel™ table. The database 56 data 58 can be imported into the processor 54 as a comma-separated value file or other format. The processor 54 can read the data and articulate the P1 as the connector, 1 as the cavity, and the color as the colors to populate for the image with the P1 connector either chosen by the engineer in the processor 54 or by the processor 54 reading a PL. As an alternative, in the case when the wiring table 24 is not in PDF form or is extracted out of PDF form into the same CSV or Excel file automatically by the processor 54 the data can be inserted into the system. Thus eliminating any steps for the engineer to perform aside from communicating to the processor 54 what harness drawing file to use (with a wiring table 24), and what PL file (or connector part number imported to get the connector part number).

Figure 4:
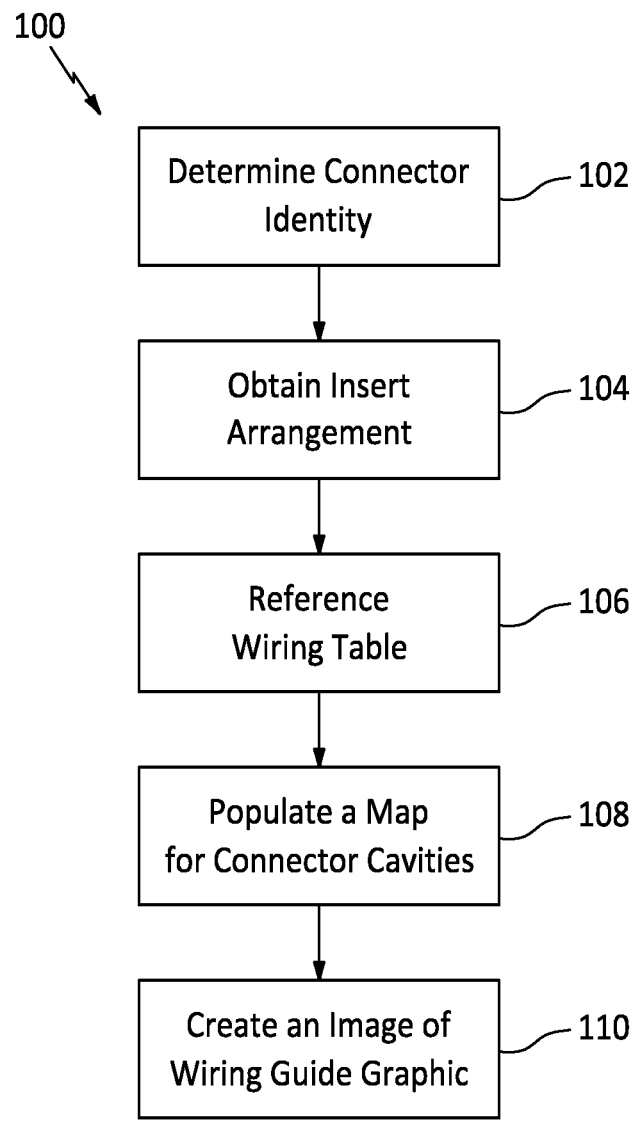
FIG. 4 is an exemplary process map.

Referring now to FIG. 4 a process flow map of the wiring guide graphic 26 creation process 100. The first step of the process 102 can include determining the connector identity. A computer processor 54 can obtain from the database 56 the connector part number or other indicator of the connector identity listed in the data 58. The connector body 12 that will be wired includes a particular connector cavity 16 arrangement/design depending on the size and shape of the connector body 12. By determining the connector identity, information about the connector body 12 can be determined.

The next step in the process 104, can include the processor 54 obtaining the insert arrangement set forth in the data 58 from the database 56. The engineering specifications for the design of the wiring harness/cable 18 have predetermined arrangements for the wires 14 and connector cavity 16 locations.

The next step 106 can include the processor 54 referencing the database 56 with the wiring table 24 to obtain information utilized in the connector plugging process 100. The wiring table 24, as described above, can include the wire 14 information and connector cavity 16 information to locate the proper wire 14 for the appropriate connector cavity 16, including the wire color, cavity identification, and/or empty cavity indication. The computer processor 54 can obtain the necessary data 58 from the wiring table 24 from the database 56.

The next step 108 in the process can include the processor 54 populating a map for the connector cavities 16. The computer processor 54 can populate the map that indicates the connector cavities that require specific wire 14 insertion into specific connector cavities 16 and maps those combinations.

The next step 110 can include the processor 54 creating an image of the wiring guide graphic 26. The wiring guide graphic 26 can be utilized by the operator 20 to properly insert the electrical pin 10 of the wire 14 into the proper connector cavity 16. The wiring guide graphic 26 is configured to provide a visual map between the technical requirements (how the connector should be plugged) in order to locate visually where the wire 14 should be inserted into the connector cavity 16. The wiring guide graphic 26 can be included with a work instruction (not shown) for the operator 20 to use as a guide/map when performing the connector plugging process.

The various forms of data in database 56 from the wiring table 24, parts list 50, and engineering specification 52 can be transmitted to one or more processors 54 (e.g., computer systems having a central processing unit and memory) for recording, processing and storing the data received. The processor 54 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. The processor 54 may be in communication (such as electrical communication) with the data and may be configured to receive input, such as images and/or design information from the data. The processor 54 can receive information/data 58 about the harness/cable 18 and/or connector body 12 and/or wire 14 captured and transmitted to the database 56 via a communication channel 55. Upon receiving the information about the harness/cable 18 and/or connector body 12 and/or wire 14, the processor 54 can process data 58 from the database 56 to create the wiring guide graphic 26. The processor 54 can automate the creation of the wiring guide graphic 26. The processor 54 would obtain the insert arrangement based on the connector 12 part number, and auto-populate the connector cavities 16 based on the wire table 24. This would output an image 26 that could be inserted into the procedure, to assist the operator 20 in assembly. The wiring guide graphic 26 allows for verification of the correct wiring for the connector plugging process.

The disclosed process includes the technical advantage of a processor that is configured to automatically read the wire list, relieving an engineer from the duty of manually performing that task.

The disclosed process includes the technical advantage of a processor that automatically determines the proper insert arrangement graphic based on the connector part number.

The disclosed process includes the technical advantage of a processor that automatically populates the wire guide graphic based on the wiring table.

The disclosed process includes the technical advantage of a processor that automatically creates the wiring guide graphic that maps between the technical requirements and the physical insert arrangement of the connector.

The disclosed process includes the technical advantage of a processor that automatically provides the wiring guide graphic which visually represents a technical wiring table for the ease of understanding for the operator during assembly.

The disclosed process includes the technical advantage of a processor that automatically produces a graphic that is a visual map between the technical requirements for the wiring harness/cable and the resulting assembly of the wiring harness/cable.

The disclosed process includes the technical advantage of a processor that can enable a robot/assembly machine to automatically identify the wire, determine what cavity the wire belongs in based on the map, and where that cavity is located on the physical connector based on the map, and then inserts the wire into the cavity.

The disclosed process includes the technical advantage of a processor that utilizes software code enabling a digital map between the technical requirements and resulting assembly to reduce human error.

There has been provided a process for the preparation of the graphic for connector plugging. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:
1. A system for creating a wiring guide graphic comprising:
a database including inputs of a connector body identity, an engineering specification and a wiring table, wherein the engineering specification includes a con- nector part number and a particular arrangement of wires to be inserted into any particular connector cavity; and a processor in operative communication with said database, said processor configured to create the wiring guide graphic, wherein said wiring guide graphic comprises a visual graphic of a connector body plugging face, wherein the wiring guide graphic is configured to indicate a cavity identification, a wire color, and a location of a cavity to remain empty, wherein the processor being configured in the case when the wiring table is not in PDF form or is extracted out of PDF form into the same CSV or Excel file automatically by the processor, data can be inserted into the system.

2. The system according to claim 1, further comprising a tangible, non-transitory memory configured to communicate with said processor, the tangible, non-transitory memory having instructions stored therein that, in response to execution by the processor, cause the processor to perform operations comprising:

receiving, by the processor, data for said connector body identity from said database;

receiving, by the processor, data for said engineering specification detailing a wire insert arrangement from said database;

receiving, by the processor, data for said wiring table from said database;

determining, by the processor, a map of each connector cavity associated with said connector body configured to populate each connector cavity associated with said connector body; and creating, by the processor, an image of a wiring guide graphic.

3. The system according to claim 2, wherein said map identifies each said connector cavity location and associates at least one of said wire, an empty space and a dummy contact for each said connector cavity.

4. The system according to claim 2, wherein said wiring table comprises at least one of a systematic listing of a Find number, a wire gauge, a wire color, a reference designation, and a station number from one side of the wire to another side of the wire.

5. The system according to claim 3, wherein said connector cavity location is indicated by a coded system including at least one of a numerical code, an alphabetical code and an alpha-numerical code to indicate a location of the connector cavity.

6. The system according to claim 1, wherein said wiring guide graphic is configured to provide a visual map between technical requirements in order to locate visually where the wire should be inserted into the connector cavity.

7. A system comprising a computer readable storage device readable by the system, tangibly embodying a program having a set of instructions executable by the system to perform the following steps for creating a wiring guide graphic, the set of instructions comprising:

an instruction to read at least one connector identity;

an instruction to read at least one engineering specification indicating an insert arrangement, wherein the engineering specification includes a connector part number and a particular arrangement of wires to be inserted into any particular connector cavity;

an instruction to read at least one wiring table;

an instruction to populate a map for connector cavities;

an instruction to create an image of a wiring guide graphic, wherein said wiring guide graphic comprises a visual graphic of a connector body plugging face, wherein the wiring guide graphic is configured to indicate a cavity identification, a wire color, and a location of a cavity to remain empty or an enhancement; and an instruction for configuring a processor in the case when the at least one wiring table is not in PDF form or is extracted out of PDF form into the same CSV or Excel file automatically by the processor, data can be inserted into the system.

8. The system according to claim 7, wherein said population of the map identifies each connector cavity and associates at least one of a wire and an empty space for each said cavity.

9. The system according to claim 7, wherein said wiring table comprises at least one of a systematic listing of a Find number, a wire gauge, a wire color, a reference designation, and a station number from one side of the wire to another side of the wire.

10. The system according to claim 7, wherein said connector cavity location is indicated by a coded system including at least one of a numerical code, an alphabetical code and an alpha-numerical code to indicate a location of the connector cavity.

11. The system according to claim 7, wherein said wiring guide graphic is configured to provide a visual map between technical requirements in order to locate visually where the wire should be inserted into the connector cavity.

12. A process for creating a wiring guide graphic by use of a system including a processor configured to receive from a database inputs of a connector body identity, an engineering specification and a wiring table, wherein the engineering specification includes a connector part number and a particular arrangement of wires to be inserted into any particular connector cavity; said processor configured to create the wiring guide graphic, a tangible, non-transitory memory configured to communicate with said processor, the tangible, non-transitory memory having instructions stored therein that, in response to execution by the processor, cause the processor to perform operations comprising:

receiving, by the processor, data for said connector body identity from said database;

receiving, by the processor, data for said engineering specification detailing a wire insert arrangement from said database;

receiving, by the processor, data for said wiring table from said database;

determining, by the processor, a map of each connector cavity associated with said connector body configured to populate each connector cavity associated with said connector body;

creating, by the processor, an image of a wiring guide graphic, wherein said wiring guide graphic comprises a visual graphic of a connector body plugging face, wherein the wiring guide graphic is configured to indicate a cavity identification, a wire color, and a location of a cavity to remain empty; and performing, by the processor, in the case when the wiring table is not in PDF form or is extracted out of PDF form into the same CSV or Excel file automatically by the processor, data being inserted into the system.

13. The process according to claim 12, wherein said map identifies each said connector cavity location and associates at least one of said wire and an empty space for each said connector cavity.

14. The process according to claim 12, wherein said wiring table comprises at least one of a systematic listing of a Find number, a wire gauge, a wire color, a reference designation, and a station number from one side of the wire to another side of the wire.

15. The process according to claim 12, wherein said connector cavity location is indicated by a coded system including at least one of a numerical code, an alphabetical code and an alpha-numerical code to indicate a location of the connector cavity.

16. The process according to claim 12 further comprising:
    inserting at least one wire into a connector cavity responsive to said wiring guide graphic.

\* \* \* \* \*